Patented July 16, 1940

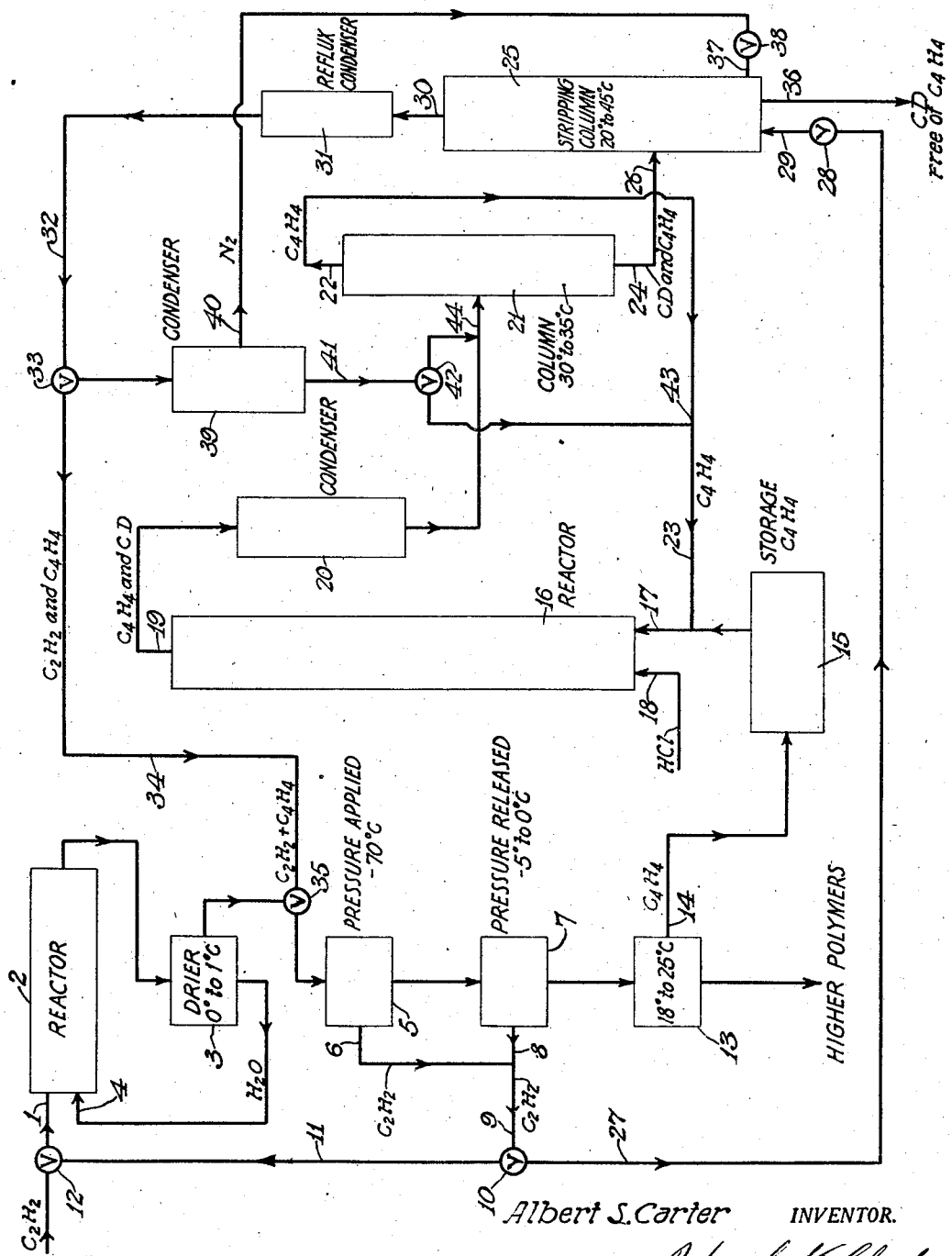

2,207,784

UNITED STATES PATENT OFFICE 2,207,784

PROCESS FOR MAKING 2-CHLORO-1,3-BUTADIENE

Albert S. Carter, Wilmington, Del., assignor to E. I. du Pont de Nemours & Company, Wilmington, Del., a corporation of Delaware Application October 15, 1937, Serial No. 169,168

4 Claims. (Cl. 260—655)

This invention relates to the manufacture of hydrogen halide addition products of vinylacetylene. More particularly it relates to a method for the manufacture of 2-chloro-1,3-butadiene substantially free of vinylacetylene.

In the manufacture of 2-chloro-1,3-butadiene (hereinafter called chloroprene) by the process described in U. S. Pat. No. 1,950,434, issued March 13, 1934, to Downing, Carter and Hutton, the chloroprene leaving the reaction chamber is mixed with unreacted monovinylacetylene. In fact, regardless of the method of manufacturing chloroprene, monovinylacetylene is usually present as an impurity in the product. In the past, thermal distillation has been used to remove the monovinylacetylene from the chloroprene, but this method has proved unsatisfactory in some respects because it results in the formation of polymers of chloroprene in the distilling liquid and the deposit of a bulky granular solid throughout the distillation equipment. This necessitates frequent dismantling and costly cleaning of the equipment and also results in the loss of chloroprene as polymers.

An object of this invention is the production of hydrogen halide addition products of vinylacetylene substantially free of vinylacetylene. A further object of the invention is a process of making chloroprene in which the vinylacetylene removed from the chloroprene is returned to the system for further reaction. A still further object is a continuous process of making chloroprene in high yield substantially free of vinylacetylene.

These objects have been accomplished by stripping the vinylacetylene from the hydrogen halide addition products of vinylacetylene by means of an inert gas and recirculating the vinylacetylene to the reaction system.

The single figure of the drawing is a flow sheet of the process herein described.

When the process of this invention is carried out continuously, beginning with the making of monovinylacetylene from acetylene (for example according to U. S. Pat. No. 2,048,838, issued July 28, 1935, to Carter and Downing) it is advantageous to use acetylene as the inert gas for stripping monovinylacetylene from chloroprene. As is shown in the drawing, acetylene is introduced at 1 into a reactor 2 where it is converted in the presence of an aqueous cuprous chloride catalyst into nonbenzenoid acetylene polymers. The effluent gases also contain water vapor and unreacted acetylene. These gases are passed into a drier 3 and the water returned to the reactor at 4. Pressure is then applied at 5 and the temperature is lowered (for example to —70° C.) thereby producing condensation of all of the reaction products. The unreacted acetylene is not all condensed and the uncondensed acetylene is vented at 6. The pressure is released at 7 and the remaining unreacted acetylene is thereupon vaporized and vented at 8. The acetylene returns through conduit 9, valve 10 and conduit 11 to the acetylene supply at 12. The temperature of the acetylene polymers is raised above the boiling point of monovinylacetylene at 13 (for example between 18° and 25° C.) and the monovinylacetylene passes off through conduit 14, storage tank 15, and thence into reactor 16 at 17. Hydrogen chloride is introduced into reactor 16 at 18, and a mixture of chloroprene (abbreviated "CD" in the briefing on the drawing) and unreacted monovinylacetylene is vented at 19 and liquefied in condenser 20. The mixture then enters about midway up the column 21 where the temperature is raised to between 30 and 35° C. Part of the monovinylacetylene is thereby vaporized and vented at 22 and passes back to the reactor through conduit 23. The chloroprene still containing an undesirable amount of vinylacetylene leaves column 21 at 24 and is passed into the packed stripping column 25 at 26, midway up the packed section. Part of the acetylene from conduit 9 is diverted at valve 10 into conduit 27 and it is passed through valve 28 into the stripping column 25 at 29. As the acetylene passes up the column, it contacts the chloroprene and entrains and removes the monovinylacetylene therefrom. Acetylene and entrained monovinylacetylene leave the stripping column at 30 and are passed through a reflux condenser 31 to remove any entrained chloroprene. These gases then pass through conduit 32, valve 33, conduit 34 and are returned to the effluent gases of reactor 2 at 35. Chloroprene substantially free of (containing less than 1%) monovinylacetylene leaves the stripping column at 36. With the temperature of the column held at 20° to 45° C., the liquid is contacted with a sufficient volume of gaseous acetylene to reduce the vinylacetylene content of the chloroprene to less than 0.5% by analysis. The volume of acetylene required is dependent upon the length and diameter of the column and the initial vinylacetylene content of the liquid. The liquid discharging from the bottom of the column contains little or no polymer.

It is to be understood that the acetylene for the stripping step need not be taken from the recovered unreacted acetylene at 10, but may be taken from the acetylene supply at a point either before or after the return of unreacted acetylene thereto at 12; or it may be from a separate acetylene supply, although the flow sheet shows the preferred arrangement.

Where it is desired to make chloroprene independently of the making of monovinylacetylene, there is no particular advantage in using acetylene in the stripping column. Any fluid which is in the non-liquid state at the temperature and pressure used in the stripping operation and which is inert to chloroprene and to monovinylacetylene may be used in the stripping operation. The term "inert gas" is used to signify such a non-liquid fluid. Those inert gases are preferred which satisfy these conditions at a preferred temperature (between 20° and 45° C.) and atmospheric pressure. Examples of such inert gases are nitrogen, carbon dioxide and the inert gases of the zero group of the periodic table.

Referring again to the figure and using nitrogen as an example, monovinylacetylene from the storage tank 15 is introduced into reactor 16 at 17. Hydrogen chloride is introduced into the reactor at 18 and a mixture of monovinylacetylene and chloroprene are vented at 19 as before. This mixture is condensed as 20 and passed into column 21 where some of the monovinylacetylene is volatilized, vented at 22 and returned to the reactor through conduit 23. The chloroprene with the remaining monovinylacetylene leaves column 21 at 24 and is passed into stripping column 25. Valve 26 is closed and nitrogen or other inert, relatively insoluble gas is introduced into stripping column 25 at 37 by opening valve 38. The mixture of nitrogen and monovinylacetylene is vented at 30 and passes through reflux condenser 31 and conduit 32 to valve 33. Valve 33 is adjusted so that the mixture of gases passes to condenser 39 where the monovinylacetylene is liquefied. Nitrogen is vented from condenser 39 at 40 and is returned to the stripping column at 37. The monovinylacetylene leaves condenser 39 at 41, passes through valve 42 and enters the return conduit 23 at 43 for recirculation through reactor 16. Substantially monovinylacetylene free chloroprene leaves the column at 36. When this process is used, it is not essential that the gases effluent from stripping column 25 be free of chloroprene, since the monovinylacetylene may be returned to the reaction system just prior to the separation of monovinylacetylene and chloroprene. When it is convenient to operate the stripping column with little or no dephlegmation, allowing some chloroprene to be stripped out in the gas together with the monovinylacetylene, the two are condensed together from the stripping gas in condenser 39 and are then introduced directly into the condensate from the condenser 20 at 44 by adjusting valve 42. There is then no need to operate reflux condenser 31 and it may, if desired, be used simply as a part of conduit 32 or it may be by-passed. Suitable blowers and pumps not shown in the figure are installed where needed to propel the fluids and suitable valves and fittings are placed where required. It will be understood that the flow sheet is diagrammatic and that no attempt has been made to give apparatus details which are unnecessary to an understanding of the invention.

Regardless of whether the process is operated with the manufacture of vinylacetylene, using acetylene in the stripping column, and the effluent gases are returned at 35; or whether the process is operated independently with monovinylacetylene from storage tank 15 and the monovinylacetylene returned to the system at 43 or 44, the monovinylacetylene stripped from the chloroprene is returned to the reactor system prior to the partial separation of chloroprene and monovinylacetylene in column 21. In each instance, the monovinylacetylene is recirculated to the reactor 16.

The stripping zone must produce efficient contact between the inert gas and the chloroprene. Any apparatus which will accomplish this result is suitable for the process of the invention. For example, a stripping column packed with copper or glass rings, carborundum, chain or other material suitable for packing similar column may be used. It may be jacketed with a constant temperature liquid.

The process of this invention may be operated at any convenient pressure. The use of vacuum assists the process in some respects but the disadvantages generally outweigh the advantages. It is generally most convenient to carry out the gas stripping at or slightly above atmospheric pressure. The temperature of the stripping operation may be controlled within suitable limits. Since it is an object of this invention to prevent further polymerization by heat, it is desired to keep the temperature as low as possible consistent with efficient stripping. It has been found that the process can be efficiently operated at a temperature of between 20° to 45° C. While the process is not inoperative at higher temperatures, such temperatures result in a greater tendency of the chloroprene to polymerize. Lower temperatures are also operative but are less efficient with regard to the amount of gas required for the removal of the volatile impurity.

Specific details for that part of the process which has to do with making monovinylacetylene from acetylene have not been given here since the process is not limited in this regard. Thus, while the process of U. S. Pat. No. 2,048,838 has been referred to for specific disclosure, yet it is within the scope of the present invention to vary that process in any suitable way. For example, the process of converting acetylene to monovinylacetylene described in U. S. application Ser. No. 151,644, filed July 2, 1937, may be used for this part of the process of the present application. Also monovinylacetylene may be removed from higher acetylene polymers by the process of copending U. S. application Serial No. 169,169 filed October 15, 1937. Similarly the making of chloro-2-butadiene-1,3 from monovinylacetylene may be carried out in any suitable manner. For example, the process of U. S. Pat. No. 1,950,434 may be used or the process described in U. S. application No. 152,518, filed July 8, 1937, that described in U. S. application No. 169,192, filed October 15, 1937, or that in U. S. application No. 178,929 filed December 9, 1937, may be used.

The essential improvement of the process of the present application resides in the removal of monovinylacetylene from chloroprene in such manner as to prevent loss of chloroprene as chloroprene polymers or in any other way. Moreover, this improvement is accentuated in that it is so intimately connected with the steps of making monovinylacetylene and chloroprene that the purification of chloroprene is accomplished without the loss of unreacted monovinylacetylene, which material is returned to the reaction system and reused. Furthermore, the process herein described is not only economical in operation but avoids hazards to the workers due to explosions which not infrequently accompany thermal and vacuum distillation of chloroprene to remove monovinylacetylene.

A process has been described for safe and efficient production of chloroprene in high yield free of monovinylacetylene. While the process of the invention has been described with reference to the manufacture of chloroprene, it is obvious that it is likewise applicable to the manufacture of other hydrogen chloride addition products of vinylacetylene and to the manufacture of hydrogen bromide addition products of vinylacetylene by suitable changes in the details of the process. It will be understood that any variations or departures from the disclosure which conform to the spirit of the invention are intended to be embraced within the scope of the claims.

I claim:

1. In a process of making 2-chloro-1,3-butadiene by reacting monovinylacetylene with hydrogen chloride to form 2-chloro-1,3-butadiene as a product of the reaction, the steps of partially separating unreacted monovinylacetylene from the crude products, passing said products in the liquid phase through a stripping zone at a temperature of between 20° C. and 45° C., passing an inert gas through the stripping zone to remove substantially all of the remaining monovinylacetylene from said products, and returning the thus removed monovinylacetylene to the reaction system.

2. In a process of making 2-chloro-1,3-butadiene by reacting monovinylacetylene with hydrogen chloride to form 2-chloro-1,3-butadiene as a product of the reaction, the steps of partially separating unreacted monovinylacetylene from the crude products, passing said products in the liquid phase through a stripping zone at a temperature of between 20° C. and 45° C., passing acetylene counter-current through the stripping zone to remove substantially all of the remaining monovinylacetylene, separating the acetylene from the monovinylacetylene, returning the monovinylacetylene to the reaction system, and recirculating the acetylene through the stripping zone.

3. In a process of making 2-chloro-1,3-butadiene by reacting monovinylacetylene with hydrogen chloride to form 2-chloro-1,3-butadiene as a product of the reaction, the steps of partially separating unreacted monovinylacetylene from the crude products, passing said products in the liquid phase through a stripping zone at a temperature of between 20° C. and 45° C., passing nitrogen counter-current through the stripping zone to remove substantially all of the remaining monovinylacetylene, separating the nitrogen from the monovinylacetylene, returning the monovinylacetylene to the reaction system, and recirculating the nitrogen through the stripping zone.

4. The process of making 2-chloro-1,3-butadiene which comprises reacting acetylene in a first reaction zone to produce monovinylacetylene as the principal product, sweeping the gaseous products out of said zone with unreacted acetylene, separating acetylene from the effluent gases of the first reaction zone, separating monovinylacetylene from the products of the first reaction zone, reacting the monovinylacetylene with hydrogen chloride in a second reaction zone to form 2-chloro-1,3-butadiene as the principal product, sweeping the gaseous products out of the second reaction zone with unreacted monovinylacetylene, partially removing monovinylacetylene from the products of the second reaction zone, passing said products in the liquid phase through a stripping zone at 20° to 45° C., and passing acetylene counter-current through the stripping zone to remove substantially all of the remaining monovinylacetylene, refluxing the effluent gases of the stripping zone to retain 2-chloro-1,3-butadiene and passing the acetylene and monovinylacetylene effluent from the stripping zone into the effluent gases of the first reaction zone at a point in the process prior to the removal of acetylene from the effluent gases of the first zone.

ALBERT S. CARTER.